(12) United States Patent
Steffens et al.

(10) Patent No.: US 9,987,722 B2
(45) Date of Patent: Jun. 5, 2018

(54) HARD-ROLLING ROLLER

(75) Inventors: Hans-Toni Steffens, Erkelenz (DE); Hans Zimmermann, Selfkant (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 1016 days.

(21) Appl. No.: 14/235,495

(22) PCT Filed: Jul. 20, 2012

(86) PCT No.: PCT/DE2012/000750
§ 371 (c)(1),
(2), (4) Date: Jul. 28, 2014

(87) PCT Pub. No.: WO2013/013659
PCT Pub. Date: Jan. 31, 2013

(65) Prior Publication Data
US 2014/0326032 A1 Nov. 6, 2014

(30) Foreign Application Priority Data
Jul. 28, 2011 (DE) .................... 20 2011 103 888 U

(51) Int. Cl.
*B24B 39/04* (2006.01)
*B21H 7/18* (2006.01)
*B23P 9/02* (2006.01)
*B24B 39/00* (2006.01)

(52) U.S. Cl.
CPC .............. *B24B 39/04* (2013.01); *B21H 7/185* (2013.01); *B23P 9/02* (2013.01); *B24B 39/003* (2013.01); *B24B 39/045* (2013.01); *Y10T 29/17* (2015.01)

(58) Field of Classification Search
CPC ..... B24B 39/04; B24B 39/003; B24B 39/045; B21H 7/185
USPC .......................... 72/102, 110; 29/90.01, 6.01
See application file for complete search history.

(56) References Cited

U.S. PATENT DOCUMENTS

| 2,977,669 | A | * | 4/1961 | Chambers ............... B24B 39/00 29/90.01 |
| 5,099,558 | A | | 3/1992 | Wilson |
| 6,389,861 | B1 | | 5/2002 | Bagusche et al. |
| 6,393,885 | B1 | | 5/2002 | Cadena |
| 7,100,413 | B2 | | 9/2006 | Derichs |

(Continued)

FOREIGN PATENT DOCUMENTS

DE 102 30 526 A1 1/2004
DE 100 42 425 B4 3/2005

(Continued)

OTHER PUBLICATIONS

International Search Report (in German with English translation) for PCT/DE2012/000750, dated Dec. 21, 2012; ISA/EP.

(Continued)

*Primary Examiner* — David B Jones
(74) *Attorney, Agent, or Firm* — Harness, Dickey & Pierce, P.L.C.

(57) ABSTRACT

The invention relates to a hard-rolling roller for a deep rolling tool having a torus-shaped base body for deep rolling of radiuses or recesses which limit the bearing trunnion on crankshafts on both sides, and two at least approximately truncated cone-shaped central bodies, rising on both sides of the body. A cylindrical body rises on the upper end surface of one of the two central bodies.

5 Claims, 2 Drawing Sheets

(56) References Cited

U.S. PATENT DOCUMENTS

Figure 3:
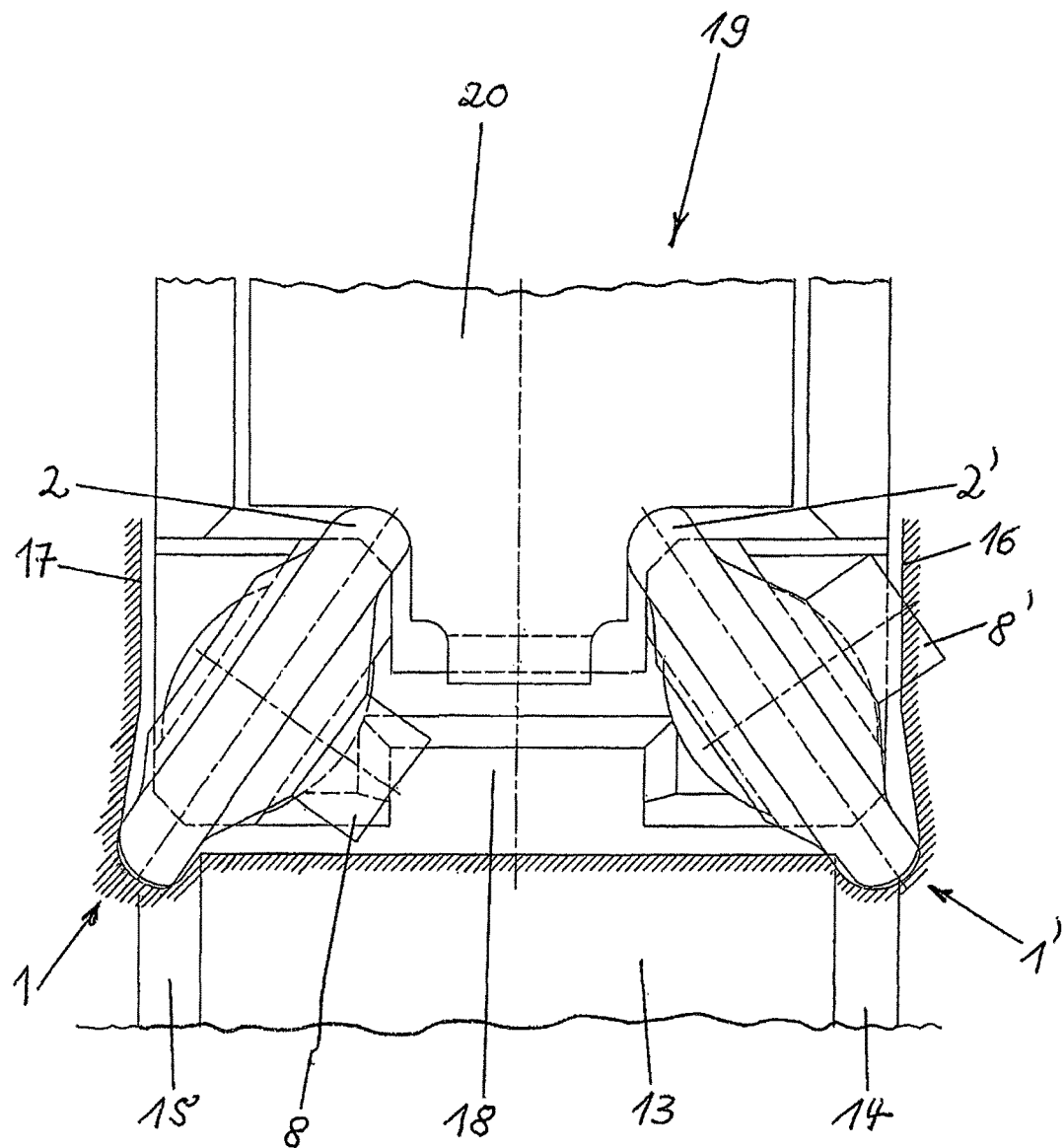

| | | | |
|---|---|---|---|
| 8,567,025 B2* | 10/2013 | Heffe | B21H 7/185 |
| | | | 29/6.01 |
| 2002/0023470 A1 | 2/2002 | Bagusche et al. | |
| 2005/0086988 A1 | 4/2005 | Derichs | |
| 2005/0107230 A1* | 5/2005 | Ostertag | B21H 7/185 |
| | | | 492/1 |
| 2012/0090141 A1* | 4/2012 | Heffe | B21H 7/185 |
| | | | 29/90.01 |
| 2014/0326032 A1* | 11/2014 | Steffens | B21H 7/185 |
| | | | 72/102 |

FOREIGN PATENT DOCUMENTS

| | | |
|---|---|---|
| DE | 20 2009 012976 U1 | 2/2010 |
| WO | WO-2005/023488 A1 | 3/2005 |

OTHER PUBLICATIONS

English Translation of the International Preliminary Report on Patentability for PCT/DE2012/000750, IB, Geneva, incorporating the English Translation of the Written Opinion of the ISA, ISA/EP, dated Dec. 21, 2012.

* cited by examiner

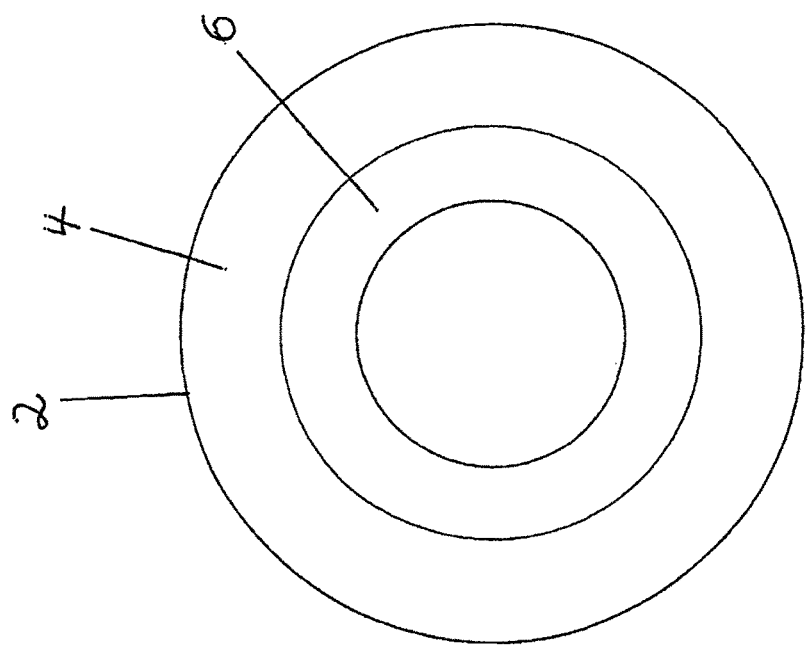
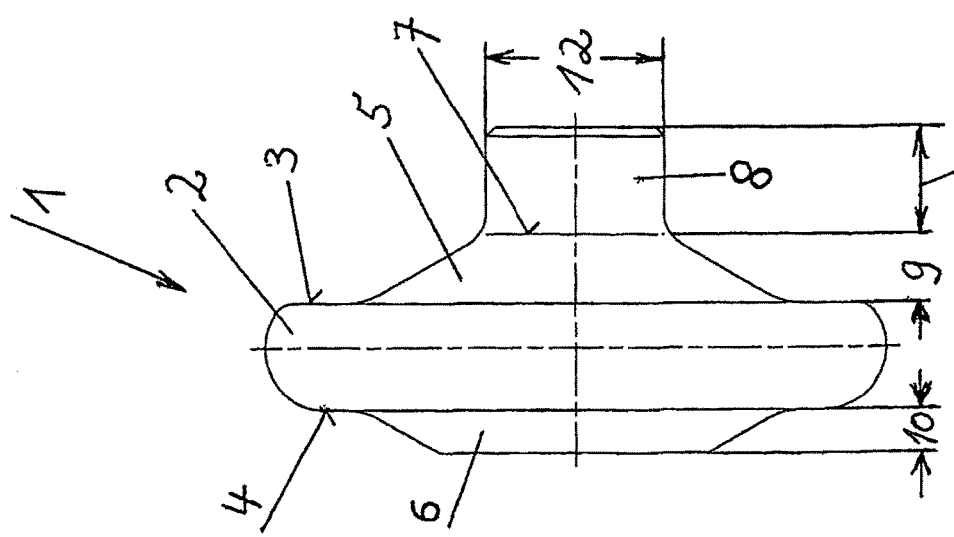

ically designed with its base body

HARD-ROLLING ROLLER

CROSS-REFERENCE TO RELATED APPLICATIONS

This application is a 371 U.S. National Stage of International Application No. PCT/DE2012/000750, filed Jul. 20, 2012, which claims priority to German Patent Application No. 20 2011 103 888.6, filed Jul. 28, 2011. The entire disclosures of the above applications are incorporated herein by reference.

FIELD

The invention relates to a hard-rolling roller for a deep rolling tool with a torus-shaped base body for deep rolling of radiuses or recesses which limit the bearing trunnions on crankshafts on both sides and two cone-shaped central bodies which are at least approximately truncated that rise on both sides of the base body.

BACKGROUND AND SUMMARY

Hard-rolling rollers generally have the shape of a low truncated cone. The base area of these truncated cones is very rounded at the edges, sometimes with different radiuses, which results in a nearly torus-shaped body. Hard-rolling rollers of the designated type are known, for example, from DE 102 30 526 A1, see FIG. 2. But hard-rolling rollers of the designated type are also shown in WO 2005/023488 A1, see FIG. 10 to FIG. 12. The hard-rolling rollers mentioned are used interchangeably in the deep rolling tools and are loosely and rotatably guided in the cages. A cage of the designated type is known, for example, from DE 100 42 425 B4. When using the above-mentioned hard-rolling rollers in the deep rolling tools, it may happen that the hard-rolling rollers are clamped in an inverted position between the cages. The consequences are premature wear of the cage and the hard-rolling rollers and an incorrectly machined crankshaft.

Hence the resulting task for the present invention is to design a hard-rolling roller in such a way that it is always mounted in the prescribed, i.e. correct, mounting position in the deep rolling tool.

According to the invention, this task is solved by the fact that a cylindrical body rises on the upper end surface of one of the two central bodies.

From U.S. Pat. No. 6,393,885 B1, hard-rolling rollers having different shapes are known in addition to the hard-rolling rollers of the type mentioned (see FIG. 3, FIG. 5a and FIG. 5b). Such hard-rolling rollers have a torus-shaped base body for deep rolling of radiuses or recesses which limit the bearing trunnions on the crankshafts on both sides, and two at least approximately truncated cone-shaped central bodies which rise on both sides of the base body, see FIG. 6 to FIG. 11. However, the known hard-rolling rollers are not intended to prevent improper installation. The design rather results from the fact that a broadened support surface at the guide roller has been created for the torus-shaped base body which has to do most of the work at deep rolling. In this way, the deep rolling force no longer acts directly on the base body on the hard-rolling roller, but on the at least approximately truncated cone-shaped central bodies rising on either side of the base body; see FIG. 6.

DRAWINGS

The invention is described in detail below using a design example. The following views, each in enlarged scale, show:

FIG. 1 Side view of a hard-rolling roller
FIG. 2 Front view of the hard-rolling roller from FIG. 1
FIG. 3 Different installation positions of the hard-rolling roller from FIG. 1

DETAILED DESCRIPTION

Hard-rolling roller 1 has a torus-shaped base body 2 for deep rolling of radiuses or recesses 14, 15 which limit the bearing trunnions 13 at the crankshafts (not shown) on both sides. The truncated cone-shaped central bodies 5 and 6 rise on both sides 3 and 4 of the base body 2. A cylindrical body 8 rises on the upper end surface 7 of the one central body 5. For example, the two central bodies 5 and 6 have differing heights 9 and 10. These height differences, however, are not absolutely necessary, so that the two heights 9 and 10 can also be the same. It is so that the height of central body 6 which does not support cylindrical body 8 can also be zero.

The cylindrical body 8, in turn, has a height 11 which is at least as high as the height 9 of the central body 5. However, it is preferable if the height 11 of the cylindrical body 8 is larger than the height 9 of the central body 5 which supports the cylindrical body 8. The diameter 12 of the cylindrical body 8 corresponds to the upper end surface 7 of the central body 5. Also to be noted is that the entire hard-rolling roller 1 is integrally designed with its base body 2, the central bodies 5, 6 and the cylindrical body 8. The hard-rolling roller 1 is made of a high-strength material.

FIG. 3 shows the differing installation positions of hard-rolling roller 1. First, any bearing trunnion 13 of a crankshaft is shown. The bearing trunnion 13 is limited on both sides by recesses 14 and 15, followed by the crank webs 16 and 17.

In the left half of FIG. 3, a hard-rolling roller 1 is shown in the correctly mounted position. On the right half of FIG. 3, a hard-rolling roller 1' is shown in an incorrectly mounted position. In the correct mounted position of the hard-rolling roller 1, the cylindrical body 8 has enough space between the two adjacent cages 18. When looking at the mounted position corresponding to the right half of FIG. 3, one can see that the cylindrical body 8' of an incorrectly mounted hard-rolling roller 1' would protrude into the crank web 16. The insertion of a deep rolling tool 19 between crank webs 16 and 17 would therefore not be possible from the outset. For the sake of completeness, it should be mentioned that the base bodies 2 and 2' of the two hard-rolling rollers 1 and 1' are supported with within the deep rolling tool 19 on a guide roller 20, as is generally known.

The invention claimed is:

1. A work roller for a crankshaft deep-rolling tool comprising:
    a torus-shaped base body comprising an annular working surface over an outer circumference thereof, and having an upper side and a lower side that is opposite to the upper side;
    a first, truncated, cone-shaped central body extending along a central axis from the upper side of the base body, the first central body having a first end having a first greater diameter and a second end having a first lesser diameter, the first end being adjacent to the upper side of the base body and the second end being offset from the base body by a first distance;
    a second, truncated, cone-shaped central body extending along the central axis from the lower side of the base body, the second central body having a third end having a second greater diameter and a fourth end having a second lesser diameter, the third end being adjacent to the lower side of the base body and the fourth end being offset from the base body by a second distance;

a cylindrical body extending along the central axis from the second end of the first central body for a third distance, the cylindrical body having a diameter that is less than or equal to the first lesser diameter;

wherein the first greater diameter is approximately the same as the second greater diameter, and the first lesser diameter is less than the second lesser diameter; and wherein the second distance is less than or equal to the first distance, the third distance is greater than or equal to the first distance.

2. The work roller of claim 1, wherein the diameter of the cylindrical body is equal to the first lesser diameter.

3. The work roller of claim 1, wherein the third distance is equal to the first distance.

4. A crankshaft deep-rolling tool comprising the work roller of claim 1.

5. A crankshaft deep-rolling tool for deep rolling the respective radiuses located between a bearing trunnion and first and second crank webs located at opposite ends of the bearing trunnion, the deep rolling tool comprising:
   a guide roller;
   a cage; and
   a pair of work rollers each rotatably retained in the cage;
   wherein each work roller comprises:
      a torus-shaped base body comprising an annular working surface over an outer circumference thereof, and having an upper side and a lower side that is opposite to the upper side;
      a first, truncated, cone-shaped central body extending along a central axis from the upper side of the base body, the first central body having a first end having a first greater diameter and a second end having a first lesser diameter, the first end being adjacent to the upper side of the base body and the second end being offset from the base body by a first distance;
      a second, truncated, cone-shaped central body extending along the central axis from the lower side of the base body, the second central body having a third end having a second greater diameter and a fourth end having a second lesser diameter, the third end being adjacent to the lower side of the base body and the fourth end being offset from the base body by a second distance;
      a cylindrical body extending along the central axis from the second end of the first central body for a third distance, the cylindrical body having a diameter that is less than or equal to the first lesser diameter;
      wherein the first greater diameter is approximately the same as the second greater diameter, and the first lesser diameter is less than the second lesser diameter; and
      wherein the second distance is less than or equal to the first distance, the third distance is greater than or equal to the first distance; and
   wherein, if a work roller is retained in the cage in an incorrect orientation, the cylindrical body of the work roller will interfere with a respective one of the first and second crank webs of the crankshaft.

\* \* \* \* \*